(12) United States Patent
Ohtsuka et al.

(10) Patent No.: US 6,532,344 B2
(45) Date of Patent: Mar. 11, 2003

(54) CAMERA INCORPORATING REAL-IMAGE FINDER

(75) Inventors: Katsumi Ohtsuka, Hachioji (JP); Haruki Nakayama, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/837,160

(22) Filed: Apr. 19, 2001

(65) Prior Publication Data

US 2001/0033748 A1 Oct. 25, 2001

(30) Foreign Application Priority Data

Apr. 20, 2000 (JP) ........................................ 2000-119170

(51) Int. Cl.⁷ ..................... G03B 17/20; G03B 13/02; G03B 13/08; G03B 17/02
(52) U.S. Cl. ..................... 396/296; 396/384; 396/386; 396/535
(58) Field of Search ...................... 396/296, 384, 396/385, 386, 535, 538, 540, 541

(56) References Cited

U.S. PATENT DOCUMENTS

| 4,565,433 A | * | 1/1986 | Kato ........................... 396/80 |
| 4,609,272 A | * | 9/1986 | Yokota et al. ............... 396/384 |
| 5,970,260 A | * | 10/1999 | Nakayama et al. .......... 396/80 |

* cited by examiner

*Primary Examiner*—David M. Gray
*Assistant Examiner*—Rochelle Blackman
(74) *Attorney, Agent, or Firm*—Finnegan, Henderson, Farabow, Garrett & Dunner, L.L.P.

(57) ABSTRACT

The present invention concerns a camera incorporating a real-image finder, having a structure more compact than ever. The camera includes an objective optical system; an erect-image optical system, having a reflecting surface, to receive a light bundle passed through the objective optical system; and an ocular optical system to receive the light bundle reflected from the reflecting surface of the erect-image optical system. In the camera, a rear end of the reflecting surface is located at a backward position with respect to a film conveyance surface and outside the film conveyance surface, and, a front end of the reflecting surface is located at a forward position with respect to the film conveyance surface and inside the film conveyance surface.

26 Claims, 5 Drawing Sheets

CAMERA INCORPORATING REAL-IMAGE FINDER

BACKGROUND OF THE INVENTION

The present invention relates to a camera, and specifically relates to a camera incorporating a real-image finder, having a structure more compact than ever.

A finder optical system, equipped besides a photographic lens system in a conventional lens shutter camera, etc., can be roughly classified into either a virtual-image finder optical system or a real-image finder optical system. As for the virtual-image finder optical system, however, there has been a problem that it becomes difficult to further minimize the dimensions of the camera, since the diameter of the front lens becomes excessively large when a high magnification capability is introduced into the camera. Therefore, there has been a tendency for a real-image finder optical system to be usually employed for small-sized cameras.

Incidentally, a real-image finder optical system can be further classified into either a type employing a roof mirror or a roof prism, or a type employing a combination of a prism and a flat mirror, a Porro prism or a mirror. A real-image finder optical system, employing a roof mirror or a roof prism, is characterized in that it is possible to position both an objective optical system and an ocular optical system on the same horizontal plane.

However, the following practical problems would tend to occur, when a real-image finder optical system, employing a roof mirror or a roof prism, is installed into a camera. At first, in case that a real-image finder optical system is disposed at such a position where interference with the film and magazine loaded on the camera is avoided, the lowest allowable position for the ocular optical system is determined by default. This fact causes the problem that, when the optical axis of the objective optical system is set on the same horizontal plane as that of the optical axis of the ocular optical system, the positional interval between the photographic lens system and the objective optical system of the finder optical system increases, resulting in enlargement of the parallax, corresponding to the amount of the positional interval.

Further, another problem is that accuracy of the objective optical system should be considerably improved, in order to suppress the total length of the real-image finder optical system, which employs a roof mirror or a roof prism, as shorter as possible.

On the other hand, although the abovementioned problems do not exist in the real-image finder optical system employing a flat mirror or a Porro prism, other problems caused by its structure have occurred. Concretely speaking, the real-image finder optical system of this type is characterized in that the optical axes of the objective optical system and the ocular optical system are shifted relative to each other in the vertical direction of the camera. This characteristic inherently makes the size of the finder unit large in the vertical direction of the camera, resulting in a trend of increased camera body size.

To cope with the abovementioned problem, in one type of conventional cameras, the size of camera body is minimized as compactly as possible by forming a protuberance only at the ocular optical system side of the camera. The camera of this type, however, cannot be shaped in a substantially rectangular parallelepiped, and it has, therefore, been a problem that the camera is inconvenient for storing, and allowances of designing the camera body are increasingly restricted.

Further, an illumination-type information-displaying member, which displays, for instance, the result of a ranging operation, is equipped in a camera to notify the photographer of information in regard to the image-capturing operation. In the above configuration, it is convenient for the photographer to display the information within the visual field of the finder, since the photographer can confirm such information while viewing the finder. It has been a difficult problem, however, to determine a suitable position for disposing the information-displaying member in such a camera, since the real-image finder optical system is a complicatedly shaped structure. Specifically, to display the information within the visual sight of the finder, the information-displaying member should be disposed in the optical path of the real-image finder optical system. For this purpose, a special space should be provided in the periphery of the finder section to arrange the information-displaying member at an appropriate position, resulting in large-sizing trend of the camera body.

SUMMARY OF THE INVENTION

To overcome the abovementioned drawbacks in conventional cameras, it is an object of the present invention to provide a camera, which is more compact than ever in spite of having a real-image finder optical system, and make it easier to view the information displayed in the finder.

Accordingly, to overcome the cited shortcomings, the abovementioned object of the present invention can be attained by cameras described as follow.

(1) A camera having a real-image finder, comprising: an objective optical system; an erect-image optical system, having a reflecting surface, to receive a light bundle passed through the objective optical system; and an ocular optical system to receive the light bundle reflected from the reflecting surface of the erect-image optical system; wherein a rear end of the reflecting surface is located at a backward position with respect to a film conveyance surface, and located outside the film conveyance surface, and, a front end of the reflecting surface is located at a forward position with respect to the film conveyance surface, and located inside the film conveyance surface.

(2) The camera of item 1, wherein the reflecting surface is disposed at such a position that the reflecting surface reflects the light bundle, received from the objective optical system, toward a direction of being apart from the film conveyance surface.

(3) A camera having a real-image finder, comprising: an objective optical system; an erect-image optical system, having a reflecting surface, to receive a light bundle passed through the objective optical system; and an ocular optical system to receive the light bundle reflected from the reflecting surface of the erect-image optical system; wherein a part of a film conveyance surface is arranged in a space between the reflecting surface and a body of the camera.

(4) A camera, comprising: a real-image finder including an objective optical system, an ocular optical system and an erect-image optical system; and an information-displaying member for displaying information within a visual field of the real-image finder, wherein, in case that a region, occupied by the objective optical system, the ocular optical system and the erect-image optical system, is projected onto a plane perpendicular to an optical axis of the objective optical system and is surrounded by an imaginary rectangular one side of which is an vertical direction of the camera, at least a part of the information-displaying member is disposed in a region to which neither the objective optical system, the ocular optical system nor the erect-image optical system belongs.

(5) The camera of item 4, wherein the information-displaying member is disposed at a side position of the objective optical system of the real-image finder.

(6) The camera of item 4, wherein the information-displaying member is disposed at a side position of the ocular optical system of the real-image finder.

(7) The camera of item 4, wherein the information-displaying member is disposed at a side position of the objective optical system of the real-image finder, and at a lower position of the ocular optical system of the real-image finder.

(8) The camera of item 4, wherein the information-displaying member includes a light emitting element, and a final reflecting surface of the erect-image optical system is a mirror, and a display-reflecting member, which emits an information-displaying light toward the mirror by reflecting the information-displaying light emitted from the light emitting element of the information-displaying member, is disposed between the mirror and a reflecting surface arranged just before the final reflecting surface.

(9) The camera of item 8, wherein the information-displaying member further includes a masking board.

(10) The camera of item 8, wherein the information-displaying member further includes a connecting board.

(11) The camera of item 3, wherein the reflecting surface is provided so as to reflect the light bundle, received from the objective optical system, in a substantially upward direction.

(12) The camera of item 1, wherein the erect-image optical system includes a Porro prism.

(13) The camera of item 1, wherein the erect-image optical system includes a mirror.

(14) The camera of item 1, wherein the erect-image optical system has a combination of a prism and a mirror.

(15) The camera of item 1, wherein a film reel chamber of a film is disposed at a left side of the camera, viewed from a rear side of the camera.

(16) The camera of item 1, wherein the objective optical system of the real-image finder is disposed at an upper position between a lens barrel and a film reel chamber in the camera.

(17) The camera of item 1, wherein at least a part of the ocular optical system of the real-image finder is disposed at a backward position of a lighting device equipped in the camera.

(18) The camera of item 3, wherein the erect-image optical system includes a Porro prism.

(19) The camera of item 3, wherein the erect-image optical system includes a mirror.

(20) The camera of item 3, wherein the erect-image optical system has a combination of a prism and a mirror.

(21) The camera of item 3, wherein a film reel chamber of a film is disposed at a left side of the camera, viewed from a rear side of the camera.

(22) The camera of item 3, herein the objective optical system of the real-image finder is disposed at a position between a lens barrel and a film reel chamber in the camera.

(23) The camera of item 3, wherein at least a part of the ocular optical system of the real-image finder is disposed at a backward position of a lighting device equipped in the camera.

(24) The camera of item 4, wherein the erect-image optical system includes a Porro prism.

(25) The camera of item 4, wherein the erect-image optical system includes a mirror.

(26) The camera of item 4, wherein the erect-image optical system has a combination of a prism and a mirror.

(27) The camera of item 4, wherein a film reel chamber of a film is disposed at a left side of the camera, viewed from a rear side of the camera.

(28) The camera of item 4, wherein the objective optical system of the real-image finder is disposed at a position between a lens barrel and a film reel chamber in the camera.

(29) The camera of item 4, wherein at least a part of the ocular optical system of the real-image finder is disposed at a backward position of a lighting device equipped in the camera.

Further, to overcome the abovementioned problems, other cameras, embodied in the present invention, will be described as follow:

(30) A camera, characterized in that,
in the camera having a real-image finder, which includes an objective optical system and an ocular optical system, for reflecting the light bundle, passed through the objective optical system, in a substantially upward direction by disposing a first reflecting surface of an erect-image optical system at a backward position of the objective optical system,
a rear end of the first reflecting surface is located at a position more backward than a surface position of a film and a front end of the first reflecting surface is located at a position lower than an upper end of the film.

(31) A camera, characterized in that,
in the camera having a real-image finder, which includes an objective optical system, an ocular optical system and an erect-image optical system, optical axes of which are shifted each other in vertical direction of the camera, and an information-displaying member for displaying information in a visual field of the finder,
the information-displaying member is disposed at such a position that the information-displaying member is included in a range of at least one of a maximum width, a maximum depth and a maximum height of the real-image finder.

(32) A camera, characterized in that,
in the camera, which comprises a real-image finder including an objective optical system, an ocular optical system and an erect-image optical system and an information-displaying member for displaying information within a visual field of the real-image finder,
in case that a region, occupied by the objective optical system, the ocular optical system and the erect-image optical system, is projected onto a plane perpendicular to an optical axis of the objective optical system and is surrounded by an imaginary rectangular one side of which is an vertical direction of the camera, at least a part of the information-displaying member is disposed in a region to which neither the objective optical system, the ocular optical system nor the erect-image optical system belongs.

Since the camera, described in item 30, has a real-image finder, which includes an objective optical system and an ocular optical system, for reflecting the light bundle, passed through the objective optical system, in a substantially upward direction by disposing a first reflecting surface of an erect-image optical system at a backward position of the objective optical system, and a rear end of the first reflecting surface is located at a position more backward than a surface position of a film and a front end of the first reflecting surface is located at a position lower than an upper end of the film, it becomes possible to provide a camera being more compact than ever, and to widen the design flexibility of the camera body, by mounting the real-image finder optical system in an unutilized space, which has been non-available space in conventional cameras. In addition, since the objective optical system of the real-image finder optical system can be disposed near the photographic lens system, it is also possible to suppress the parallax as small as possible.

Since the camera, described in item 31, has a real-image finder, which includes an objective optical system, an ocular optical system and an erect-image optical system, optical axes of which are shifted each other in vertical direction of the camera, and an information-displaying member for displaying information in a visual field of the finder, and since the information-displaying member is disposed at such a position that the information-displaying member is included in a range of at least one of a maximum width, a maximum depth and a maximum height of the real-image finder, it becomes possible to provide a camera more compact than ever by disposing the information-displaying member at an unutilized space created in the body of the camera having the real-image finder optical system of the abovementioned type.

The camera, described in item 32, comprises a real-image finder including an objective optical system, an ocular optical system and an erect-image optical system and an information-displaying member for displaying information within a visual field of the real-image finder. Further, in case that a region, occupied by the objective optical system, the ocular optical system and the erect-image optical system, is projected onto a plane perpendicular to an optical axis of the objective optical system and is surrounded by an imaginary rectangular one side of which is an vertical direction of the camera, at least a part of the information-displaying member is disposed in a region to which neither the objective optical system, the ocular optical system nor the erect-image optical system belongs. Namely, at least a part of the information-displaying member is disposed in a predetermined region of said plane, which is located between upper and lower ends of the projected planes of the three optical systems projected onto said plane, and in which none of the projected planes of the three optical systems exist. Accordingly, it becomes possible to provide a camera more compact than ever by disposing the information-displaying member at an unutilized space created in the body of the camera having the real-image finder optical system of the abovementioned type.

Further, when the information-displaying member is disposed at a side position of the objective optical system of the real-image finder, it becomes possible to effectively utilize the unutilized space formed in a side region of the objective optical system of the real-image finder.

Still further, when the information-displaying member is disposed at a side position of the ocular optical system of the real-image finder, it becomes possible to effectively utilize the unutilized space formed in a side region of the ocular optical system of the real-image finder.

Still further, when the information-displaying member is disposed at a side position of the objective optical system of the real-image finder and at a lower position of the ocular optical system of the real-image finder, it becomes possible to effectively utilize the unutilized space formed in a side region of the objective optical system of the real-image finder and at a lower region of the ocular optical system of the real-image finder.

Still further, when the information-displaying member includes a light emitting element, and a final reflecting surface of the erect-image optical system is a mirror, and a display-reflecting member, which emits an information-displaying light toward the mirror by reflecting the information-displaying light emitted from the light emitting element of the information-displaying member, is disposed between the mirror and a reflecting surface arranged just before the final reflecting surface, the photographer can view the information-displaying image precisely focused on the screen of the finder.

Still further, it is desirable that the information displaying member also includes a masking board and/or a connecting board.

Still further, when a light bundle, passed through the objective optical system of the real-image finder, is reflected in a substantially upward direction by the first reflecting surface of the elect-image optical system disposed at backward position of the objective optical system, it becomes possible to dispose the objective optical system at a position near the photographic lens system, and it is also possible to suppress the parallax as small as possible.

Still further, it is desirable that the elect-image optical system includes a Porro prism and/or a mirror, and more desirable that the elect-image optical system includes a combination of a Porro prism and a mirror.

Still further, when the camera is a reverse loading type, so to speak, in which film reel chamber 12 of the film is disposed at the left side when viewed from the rear side of the camera, it is possible to dispose the real-image finder optical system at a lower position, compared to the case that the driving section is disposed at an upward position of the camera.

Still further, when the objective optical system of the real-image finder is disposed at an upper position between a lens barrel and a film reel chamber in the camera, it becomes possible to effectively utilize, for instance, a triangle dead space formed at the upper space of the lens barrel and the film reel chamber.

Still further, when at least a part of the ocular optical system of the real-image finder is disposed at a backward position of a lighting device equipped in the camera, it becomes possible to effectively utilize an unutilized space formed at the backward space of the lighting device, and it is also possible to dispose the ocular optical system at such a position that the photographer can easily view the finder.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Referring to the drawings, an embodiment of the present invention will be detailed in the following.

Figure 1:
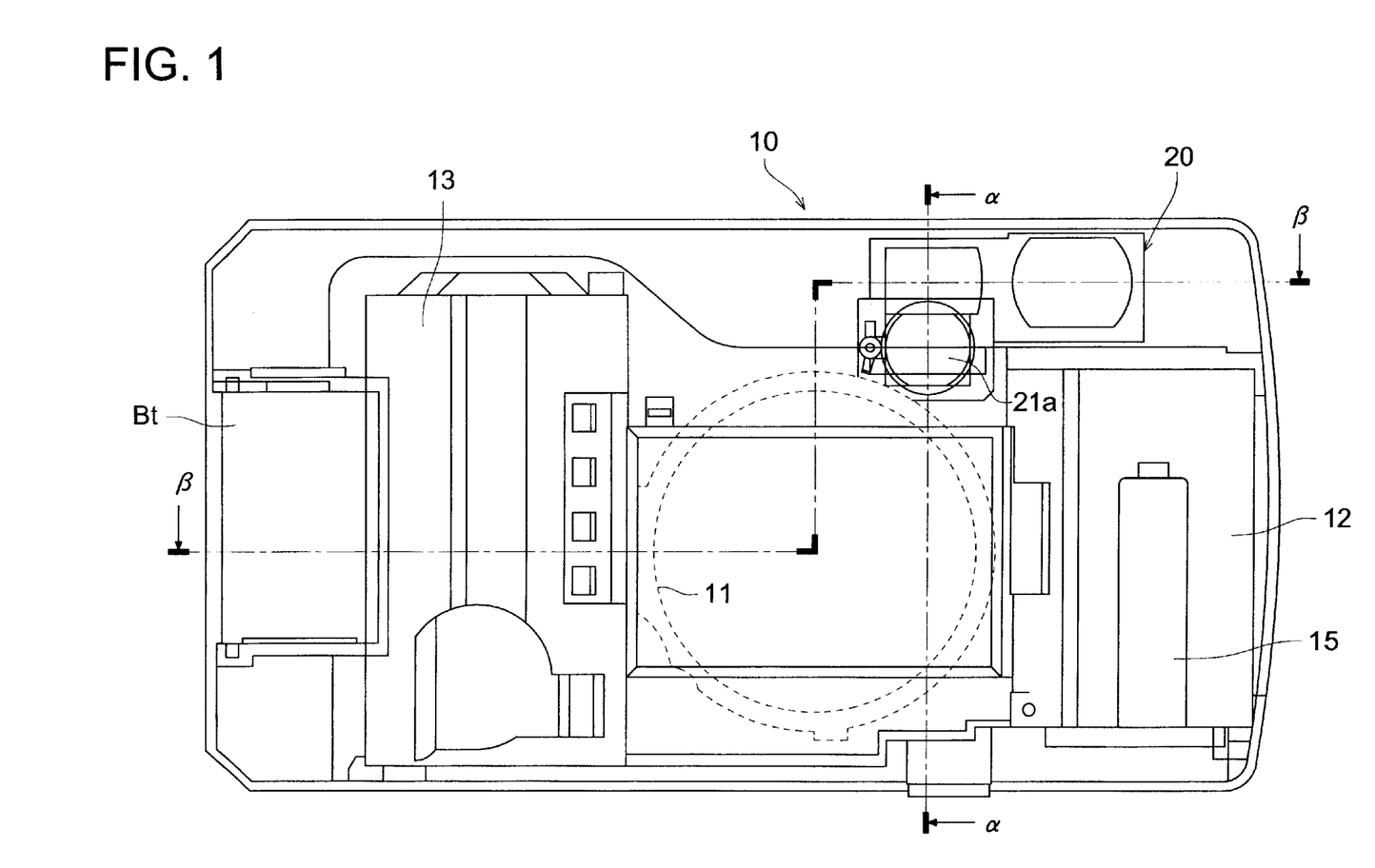
FIG. 1 shows a view of the inner structure of the camera, embodied in the present invention, viewed from the front side of the camera.
Figure 2:
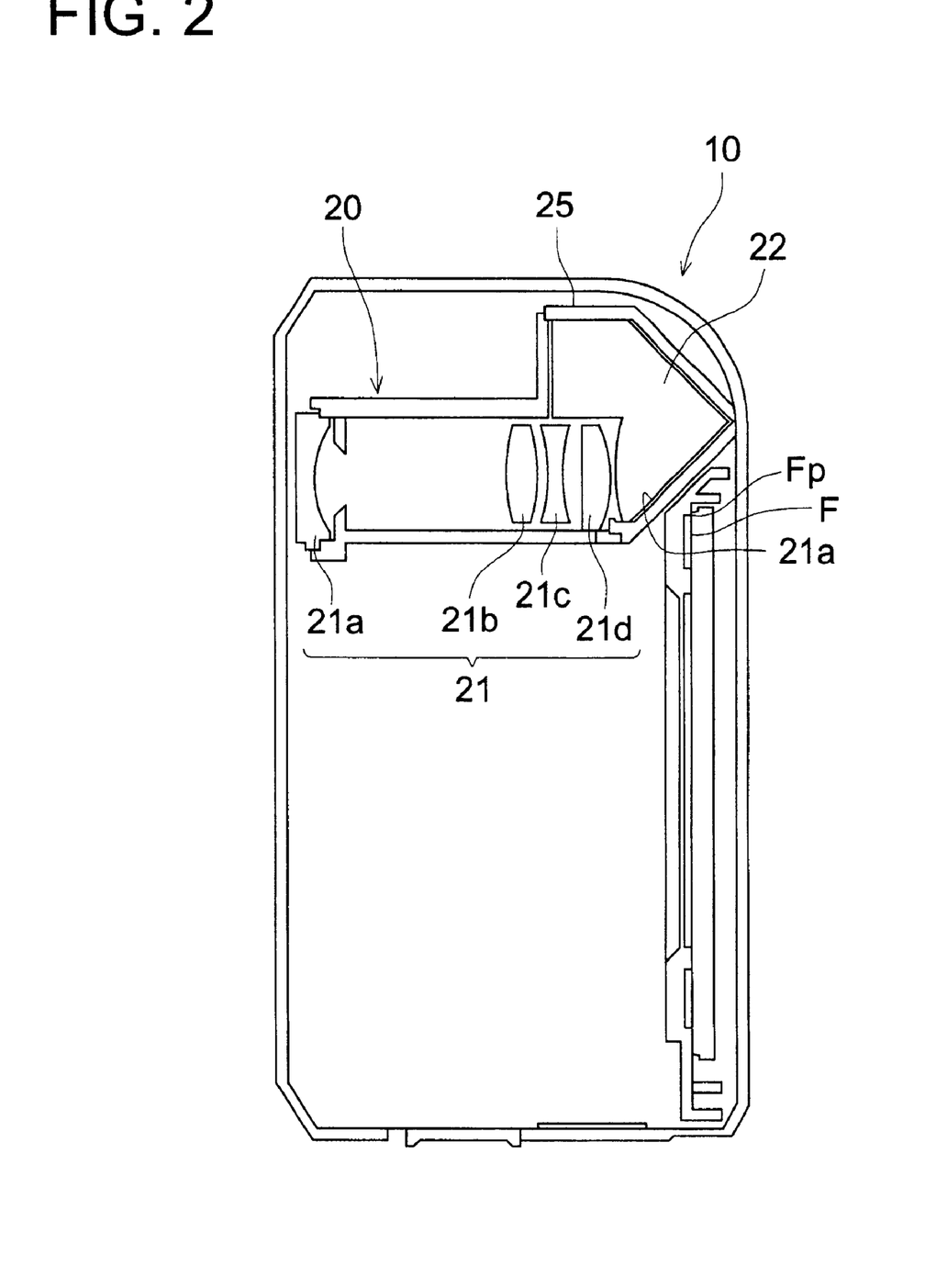
FIG. 2 shows a vertical cross-sectional view of the camera, taken on line α—α of FIG. 1.
Figure 3:
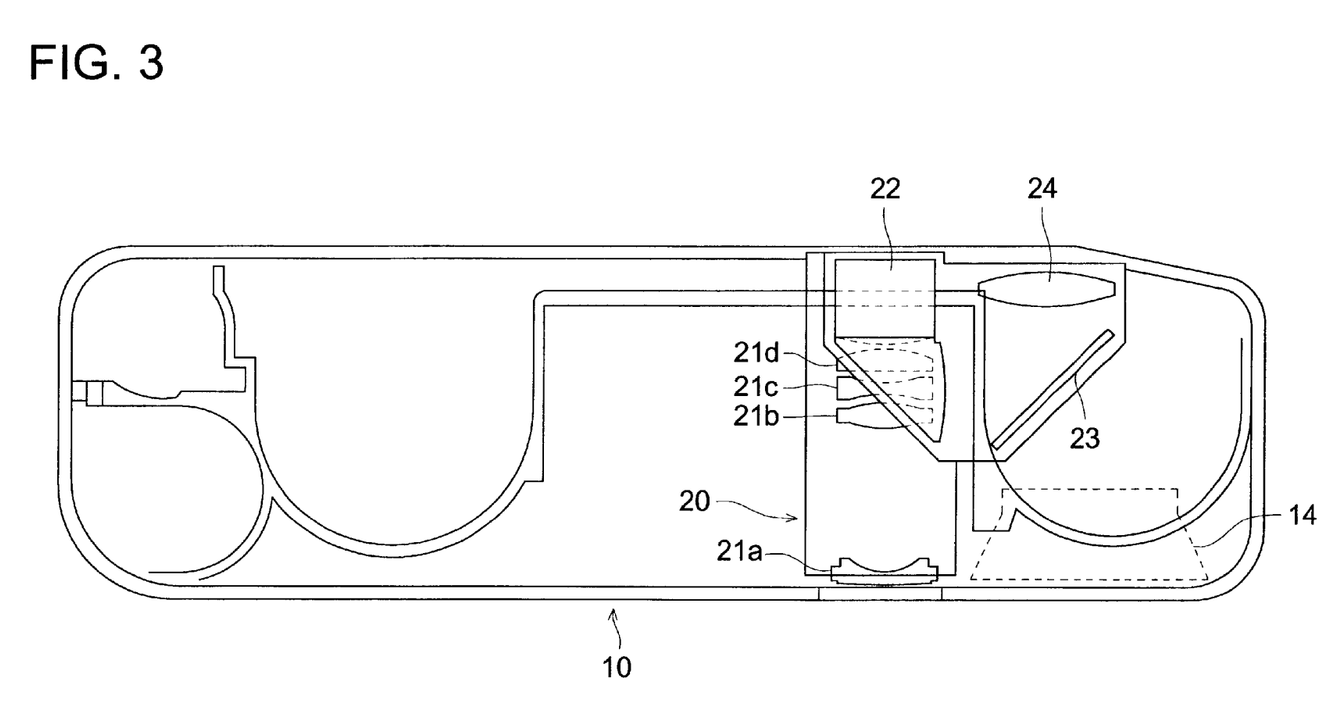
FIG. 3 shows a horizontal cross-sectional view of the camera, taken on line β—β of FIG. 1.
Figure 4:
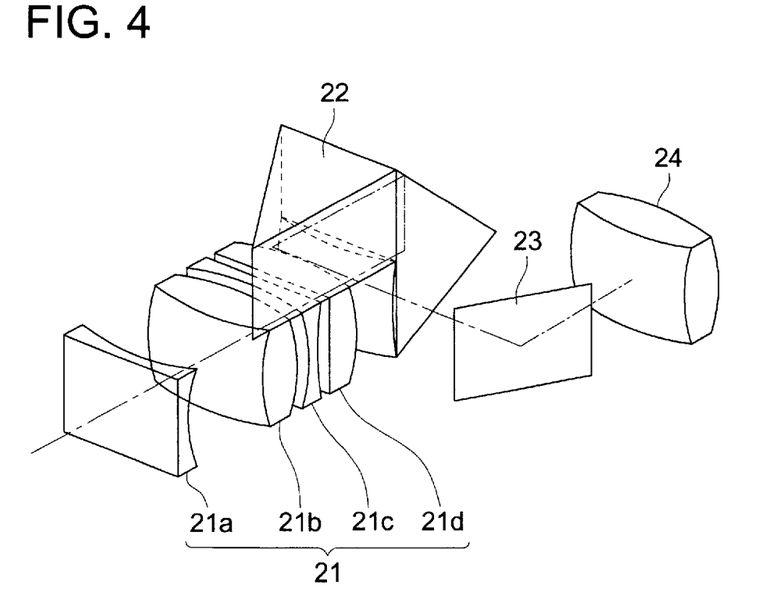
FIG. 4 shows a perspective view of an optical system installed in the real-image finder unit.

FIG. 1 shows a view of an inner structure of the camera, embodied in the present invention, viewed from the front side, FIG. 2 shows a vertical cross-sectional view of the camera, taken on line α—α of FIG. 1, FIG. 3 shows a horizontal cross-sectional view of the camera, taken on line β—β of FIG. 1, and FIG. 4 shows an exploded perspective view of an optical system installed in the real-image finder unit.

In camera 10 shown in FIG. 1, film cartridge chamber 13 and film reel chamber 12 are disposed at right and left sides of lens barrel 11, which houses the photographic lenses (not shown in the drawings), respectively. Battery Bt is disposed near film cartridge chamber 13, while motor 15, disposed in film reel chamber 12, drives the film (not shown in the drawings) loaded in film cartridge chamber 13. Incidentally, the camera, embodied in the present invention, is a so called reverse loading type, in which film reel chamber 12 of the film is disposed at the left side when viewed from the rear side of the camera. Further, real-image finder unit 20 is mounted on the upper side of lens barrel 11 and film reel chamber 12.

Real-image finder unit 20 comprises objective optical system 21 including lenses 21a–21d, prism 22, mirror 23, ocular lens 24 serving as an ocular optical system, and housing case 25. Optical system 21, including lenses 21a–21d, and prism 22 are mounted in the same housing case 25. Mirror 23 is disposed at a rear side (upper side in FIG. 3) of strobe device 14 serving as a lighting device. Incidentally, prism 22 and mirror 23 constitute an erect-image optical system.

As shown in FIG. 4, real-image finder unit 20 is so constituted that a light bundle passing through objective optical system 21 including lenses 21a–21d is reflected three times in prism 22, namely, to upper, front and right directions, and then, reflected to the rear direction so that ocular lens 24 focuses the subject image onto the retina of the photographer currently viewing the finder. In other words, the optical axes of objective optical system 21 and ocular lens 24 are shifted relative to each other in the vetical direction of the camera.

As shown in FIG. 2, the lower end of first reflective surface 21a of prism 22, mounted in real-image finder unit 20, is located at a position lower than upper end Fp of film F, and its rear end is located at a position more backward (right side in FIG. 2) than film F. Accordingly, it becomes possible to provide a camera being more compact than ever, and to widen the design flexibility of the camera body, since real-image finder unit 20 can be equipped in the unutilized space, which has been non-available space in conventional cameras. In addition, since objective optical system 21 can be disposed near the photographic lenses (not shown in the drawings) serving as a photographic lens system, it is also possible to suppress the parallax as small as possible.

Figure 5:
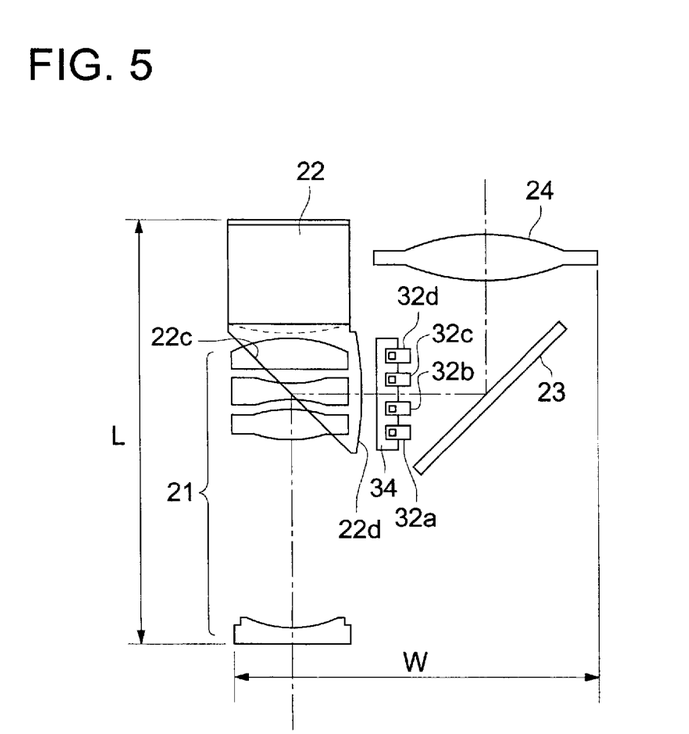
FIG. 5 shows a plane view of the optical system of the real-image finder unit, embodied in the present invention, viewed from the upper side of the camera.
Figure 6:
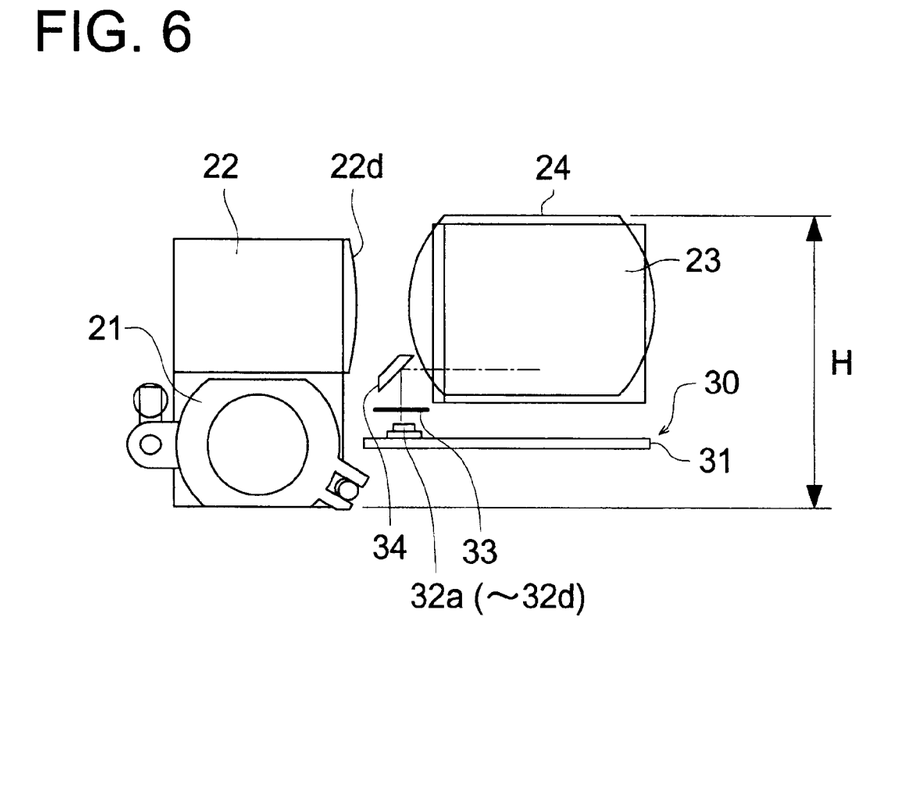
FIG. 6 shows a view of the optical system of the real-image finder unit, embodied in the present invention, viewed from the front side of the camera.
Figure 7:
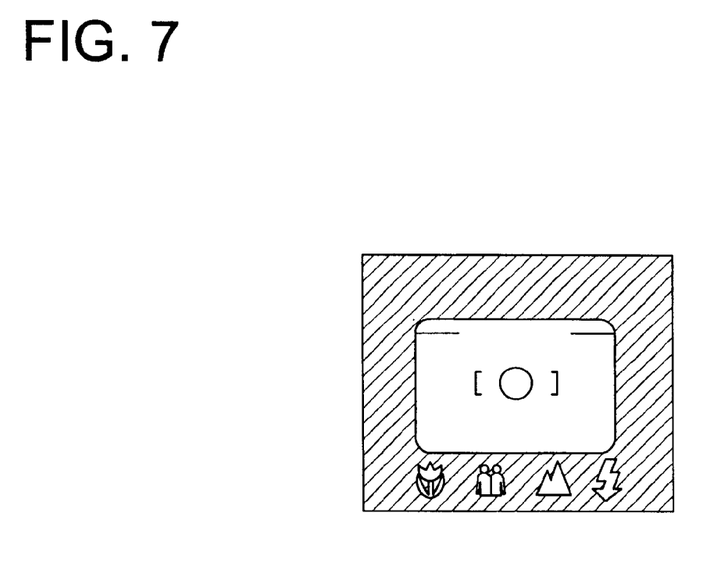
FIG. 7 shows an image displayed within a visual field frame of the real-image finder unit.

FIG. 5 shows a plane view of the optical system of real-image finder unit 20, embodied in the present invention, viewed from the upper side of the camera, FIG. 6 shows a view of the optical system of real-image finder unit 20, embodied in the present invention, viewed from the front side of the camera, and FIG. 7 shows an image displayed within the visual field frame of real-image finder unit 20.

Information-displaying member 30, for displaying the image within the visual field of the finder, is disposed at the side space of prism 22 and the lower space of mirror 23. Information-displaying member 30 comprises printed-circuit board 31, light emitting diodes 32a–32d serving as light emitting means arranged on a printed-circuit board, masking board 33 disposed at the upper side of light emitting diodes 32a–32d and small mirror 34 serving as a display-reflecting member for reflecting information-displaying light, which is emitted from light emitting diodes 32a–32d and passed through masking board 33, toward mirror 23. The figures, shown in the lower area of FIG. 7, are formed on masking board 33, so that the information-displaying light, passed through masking board 33, display the respective image based on the image-capturing operation mode (whether or not a close-up mode, a normal mode, a far-distance mode, a strobe lighting mode, etc.), and the photographer, currently viewing the finder, can verify the current image-capturing mode of the camera with the image displayed in the visual field of the finder.

Light emitting surface 22d of prism 22 and mirror 23 are separated each other with an space between them, in which small mirror 34 is disposed between mirror 23, serving as a final reflecting surface in the finder optical system, and reflecting surface 22c of prism 22. Accordingly, the information-displaying light can be easily introduced into the optical path of real-image finder optical system 20. In addition, according to the abovementioned configuration, since it is possible to dispose masking board 33 at a position equivalent to the real-image surface, the photographer can view the information-displaying image precisely focused on the screen of the finder.

According to the embodiment of the present invention, since information-displaying member 30 is arranged in such a space that it can be stored within the range of maximum width, maximum depth and maximum height of real-image finder optical system 20, it becomes possible to provide a camera more compact than ever by disposing information-displaying member 30 in an unutilized space created in the body of camera 10.

Further, according to real-image finder optical system 20 embodied in the present invention, although the rear side is higher than the front side since prism 22 is disposed at the rear side of objective optical system 21, it is possible to effectively utilize the unutilized space in the body caused by the unique shape of real-image finder optical system 20 and to dispose ocular lens 24 at such a position that the photographer can easily view the finder.

Still further, since camera 10 is a reverse-loading type, so to speak, in which film reel chamber 12 of film F is disposed at the left side of the camera, viewed from the rear side, it becomes possible to locate real-image finder optical system 20 at a position lower than ever.

Still further, since objective optical system 21 of real-image finder optical system 20 is disposed at an upper space between lens barrel 11 and film reel chamber 12 in camera 10, it becomes possible to effectively utilize a triangular space formed at the upper space of lens barrel 11 and film reel chamber 12.

Still further, since a part of ocular lens 24 of real-image finder optical system 20 is disposed at the rear side of strobe device 14 of camera 10, it becomes possible to effectively utilize the unutilized space located at the rear side of strobe device 14.

Although the present invention has been detailed referring to the embodiment disclosed in the above, needless to say that the scope of the present invention is not limited to the abovementioned embodiment, and the disclosed embodiment can be varied by a skilled person without departing from the spirit and scope of the present invention.

According to the present invention, it becomes possible to provide a more compact camera, in spite of having a real-image finder optical system, and to make it easier to monitor the information displayed in the finder.

What is claimed is:

1. A camera, comprising:
    a real-image finder including an objective optical system, an ocular optical system and an erect-image optical system; and
    an information-displaying member for displaying information within a visual field of said real-image finder,
    wherein said information-displaying member includes a light emitting element, and a final reflecting surface of said erect-image optical system is a mirror, and a display-reflecting member, which emits an information-displaying light toward said mirror by reflecting said information-displaying light emitted from said light emitting element of said information-displaying member, is disposed between said mirror and a reflecting surface arranged just before said final reflecting surface.

2. The camera of claim 1, wherein said information-displaying member is disposed at a side position of said objective optical system of said real-image finder.

3. The camera of claim 1, wherein said information-displaying member is disposed at a side position of said ocular optical system of said real-image finder.

4. The camera of claim 1, wherein said information-displaying member is disposed at a side position of said objective optical system of said real-image finder, and at a lower position of said ocular optical system of said real-image finder.

5. The camera of claim 1,
    wherein said information-displaying member further includes a masking board.

6. The camera of claim 1,
    wherein said information-displaying member further includes a connecting board.

7. The camera of claim 1, wherein said erect-image optical system includes a Porro prism.

8. The camera of claim 1, wherein said erect-image optical system includes a mirror.

9. The camera of claim 1, wherein said erect-image optical system has a combination of a prism and a mirror.

10. The camera of claim 1, wherein at least a part of said ocular optical system of said real-image finder is disposed at a backward position of a lighting device equipped in said camera.

11. A camera having a real-image finder, comprising:
    an objective optical system;
    an erect-image optical system, having a reflecting surface, to receive a light bundle passed through said objective optical system; and
    an ocular optical system to receive said light bundle reflected from said reflecting surface of said erect-image optical system;
    wherein a rear end of said reflecting surface is located at a backward position with respect to a film conveyance surface, and located outside said film conveyance surface, and, a front end of said reflecting surface is located at a forward position with respect to said film conveyance surface, and located inside said film conveyance surface; and
    wherein a film reel chamber of a film is disposed at a left side of said camera, viewed form a rear side of said camera.

12. The camera of claim 11, wherein said reflecting surface is disposed at such a position that said reflecting surface reflects said light bundle, received from said objective optical system, toward a direction of being apart from said film conveyance surface.

13. The camera of claim 11, wherein said erect-image optical system includes a Porro prism.

14. The camera of claim 11, wherein said erect-image optical system includes a mirror.

15. The camera of claim 11, wherein said erect-image optical system has a combination of a prism and a mirror.

16. The camera of claim 11, wherein at least a part of said ocular optical system of said real-image finder is disposed at a backward position of a lighting device equipped in said camera.

17. camera having a real-image finder, comprising:
    an objective optical system;
    an erect-image optical system, having a reflecting surface, to receive a light bundle passed through said objective optical system; and
    an ocular optical system to receive said light bundle reflected from said reflecting surface of said erect-image optical system;
    wherein a rear end of said reflecting surface is located at a backward position with respect to a film conveyance surface, and located outside said film conveyance surface, and, a front end of said reflecting surface is located at a forward position with respect to said film conveyance surface, and located inside said film conveyance surface; and
    wherein said objective optical system of said real-image finder is disposed at an upper position between a lens barrel and a film reel chamber in said camera.

18. A camera having a real-image finder, comprising:
    an objective optical system;
    an erect-image optical system, having a reflecting surface, to receive a light bundle passed through said objective optical system; and
    an ocular optical system to receive said light bundle reflected from said reflecting surface of said erect-image optical system;
    wherein a part of a film conveyance surface is arranged in a space between said reflecting surface and a body of said camera; and
    wherein a film reel chamber of a film is disposed at a left side of said camera, viewed from a rear side of said camera.

19. The camera of claim 18, wherein said reflecting surface is provided so as to reflect said light bundle, received from said objective optical system, in a substantially upward direction.

20. The camera of claim 18, wherein said erect-image optical system includes a Porro prism.

21. The claim of claim 18, wherein said erect-image optical system includes a mirror.

22. The camera of claim 18, wherein said erect-image optical system has a combination of a prism and a mirror.

23. The camera of claim 18, wherein at least a part of said ocular optical system of said real-image finder is disposed at a backward position of a lighting device equipped in said camera.

24. A camera having a real-image finder, comprising;

an objective optical system;

an erect-image optical system, having a reflecting surface, to receive a light bundle passed through said objective optical system; and an ocular optical system to receive said light bundle reflected from said reflecting surface of said erect-image optical system;

wherein a part of a film conveyance surface is arranged in a space between said reflecting surface and a body of said camera; and wherein said objective optical system of said real-image finder is disposed at a position between a lens barrel and a film reel chamber in said camera.

25. A camera, comprising:

a real-image finder including an objective optical system, an ocular optical system and an erect-image optical system; and an information-displaying member for displaying information within a visual field of said real-image finder, wherein said objective optical system of said real-image finder is disposed at a position between a lens barrel and a film reel chamber in said camera.

26. The camera of claim 25, wherein a film reel chamber of a film is disposed at a left side of said camera, viewed from a rear side of said camera.

* * * * *

UNITED STATES PATENT AND TRADEMARK OFFICE
CERTIFICATE OF CORRECTION

PATENT NO. : 6,532,344 B2
DATED : March 11, 2003
INVENTOR(S) : Katsumi Ohtsuka et al.

It is certified that error appears in the above-identified patent and that said Letters Patent is hereby corrected as shown below:

Column 10,
Line 2, "form" should read -- from --.
Line 19, before "camera", insert -- A --.

Signed and Sealed this

Eighteenth Day of January, 2005

JON W. DUDAS
*Director of the United States Patent and Trademark Office*